US007637642B2

(12) United States Patent
Kinnune et al.

(10) Patent No.: US 7,637,642 B2
(45) Date of Patent: Dec. 29, 2009

(54) LIGHT FIXTURE SUPPORT SYSTEM

(75) Inventors: Brian L. Kinnune, Racine, WI (US); Alan J. Ruud, Racine, WI (US)

(73) Assignee: Ruud Lighting, Inc., Racine, WI (US)

( * ) Notice: Subject to any disclaimer, the term of this patent is extended or adjusted under 35 U.S.C. 154(b) by 124 days.

(21) Appl. No.: 11/864,300

(22) Filed: Sep. 28, 2007

(65) Prior Publication Data

US 2009/0086490 A1 Apr. 2, 2009

(51) Int. Cl.
*B60Q 1/00* (2006.01)

(52) U.S. Cl. ........................ 362/368; 362/365; 362/147

(58) Field of Classification Search ................. 362/147, 362/148, 150, 365, 370, 372, 373; 248/342
See application file for complete search history.

(56) References Cited

U.S. PATENT DOCUMENTS

| | | | | |
|---|---|---|---|---|
| 3,927,315 | A | 12/1975 | Werry | |
| 4,162,779 | A | 7/1979 | Van Steenhoven et al. | |
| 4,222,093 | A | 9/1980 | Garcia et al. | |
| 4,449,168 | A | 5/1984 | Ewing | |
| 4,837,669 | A | 6/1989 | Tharp et al. | |
| 4,910,650 | A | 3/1990 | Goralnik | |
| 6,231,214 | B1 | 5/2001 | Haugaard | |
| 2006/0021718 | A1 * | 2/2006 | Franssen | 160/178.1 R |
| 2007/0058377 | A1 * | 3/2007 | Zampini et al. | 362/372 |

* cited by examiner

*Primary Examiner*—Ali Alavi
(74) *Attorney, Agent, or Firm*—Jansson Shupe & Munger Ltd.

(57) ABSTRACT

The inventive ceiling-mounted light-fixture support assembly includes a mounting bracket having upper and lower surfaces, a length, and a width between two width sides. The assembly also includes a fixture attachment member having a top with portions defining a top opening which has a width narrower than the width of the mounting bracket. The fixture attachment member further has a recessed portion defining a slideway which (a) is in lateral communication with the top opening, (b) has a width wider than the width of the mounting bracket, and (c) is spaced sufficiently lower than the opening-defining portions of the top to receive the two width sides of the mounting bracket. In use, the fixture attachment member can be positioned so that the mounting bracket is at least partially within the slideway and then repositioned so that the mounting bracket is within the top opening for light-fixture support.

15 Claims, 11 Drawing Sheets

LIGHT FIXTURE SUPPORT SYSTEM

FIELD OF THE INVENTION

This invention relates to lighting fixture and, more particularly, to supports for mounting lighting fixtures.

BACKGROUND OF THE INVENTION

Industrial lighting applications such as roadway lighting, factory lighting, parking lot lighting, and commercial building lighting often require that the lighting fixtures utilized are mounted flush against a hard ceiling or other surface. In these types of settings the location of the light can often be isolated and/or particularly high in the air. This leads to difficulty in installing and mounting the fixture.

In recent years, the use of light-emitting diodes (LEDs) for various common lighting purposes has increased, and this trend has accelerated as advances have been made in LEDs and in LED arrays, often referred to as "LED modules." Indeed, lighting applications which previously had been served by fixtures using what are known as high-intensity discharge (HID) lamps are now beginning to be served by fixtures using LED-array-bearing modules.

Among the leaders in development of LED-array modules is Philips Lumileds Lighting Company of Irvine, Calif. Work continues in the field of LED module development, and also in the field of using LED modules for various lighting fixtures in various applications. It is the latter field to which this invention relates.

Floodlights using LED modules as light source for various applications present particularly challenging problems in fixture development, particularly when floodlight mounting locations and structures will vary. Among other things, placement of the electronic LED power units (LED drivers) for lighting fixtures using LED arrays can be particularly problematic. In some cases, keeping such electronic LED drivers in a water/air-tight location may not be difficult, but if mounting locations and structures vary, then location and protection of such components becomes difficult and adds development costs and potential problems. Lighting-fixture adaptability is an important goal for LED floodlights that are often presented and mounted in different ways.

Heat dissipation is another problem for LED floodlights and in fact all large industrial type lights. And, the goals of dealing with heat dissipation and protection of electronic LED drivers and/or other internal systems and wiring can often be conflicting, contrary goals.

OBJECTS OF THE INVENTION

It is an object of the invention to provide a light fixture support assembly that overcomes some of the problems and shortcomings of the prior art, including those referred to above.

Another object of the invention is to provide a light fixture support assembly that allows easy mounting of a light fixture to a ceiling.

Another object of the invention is to provide a light fixture support assembly that is capable of supporting the light fixture during the assembly and installation process.

Another object of the invention is to provide a light fixture support assembly that allows for protection of the internal systems of the light fixture while still offering sufficient heat dissipation from the light fixture.

How these and other objects are accomplished will become apparent from the following descriptions and the drawings.

SUMMARY OF THE INVENTION

The present invention is a light fixture support assembly. The inventive ceiling-mounted light-fixture support assembly includes a mounting bracket having upper and lower surfaces, a length, and a width between two width sides. The assembly also includes a fixture attachment member having a top with portions defining a top opening which has a width narrower than the width of the mounting bracket. The fixture attachment member further has a recessed portion defining a slideway which (a) is in lateral communication with the top opening, (b) has a width wider than the width of the mounting bracket, and (c) is spaced sufficiently lower than the opening-defining portions of the top to receive the two width sides of the mounting bracket. In use, the fixture attachment member can be positioned so that the mounting bracket is at least partially within the slideway and then repositioned so that the mounting bracket is within the top opening for light-fixture support.

In another embodiment of the present invention, the fixture attachment member includes a side wall around a perimeter of the fixture attachment member extending away from the support assembly opposite the top. A slideway opening in communication with the slideway is defined within the side wall. In preferred embodiments the slideway opening is the same width as the slideway.

In a further embodiment of the light fixture support assembly, at least part of the recessed portion of the fixture attachment member is in a overlapping relationship with the portion of the fixture attachment member defining the top opening. In highly preferred embodiments, the fixture attachment member is formed as a cage.

In yet another embodiment, the mounting bracket of the light fixture support assembly includes a hook. It is preferred that the hook extends away from the lower surface of the mounting bracket.

In a still further embodiment of the light fixture support assembly, the mounting bracket includes a side flange extending from each width side and offset from the lower surface of the mounting bracket. In more preferred embodiments, the mounting bracket further includes an end flange extending from a length side and offset from the bottom side of the mounting bracket whereby at least a portion of the end flange is in an overlapping relationship with the recessed portion of the fixture attachment member.

In other preferred embodiments, the light fixture support assembly includes the light fixture itself that is an LED floodlight fixture. The LED floodlight fixture includes a housing forming a substantially water/air-tight chamber, at least one electronic LED driver enclosed within the chamber, and an LED assembly secured with respect to the housing adjacent thereto in non-water/air-tight condition, the LED assembly having at least one LED-array module mounted on an LED heat sink.

The housing preferably includes substantially water/air-tight wire-access(es) for passage of wires between the LED assembly and the water/air-tight chamber.

The housing includes a first border structure forming a first border-portion of the chamber, the first border structure receiving wires from the at least one LED-array module and the LED heat sink being interlocked with the first border structure. The housing further includes a frame structure forming a frame-portion of the chamber secured to the first border structure, the frame structure extending along the LED assembly. It is highly preferred that the border structure is a metal extrusion.

In some preferred embodiments, the first border structure has at least one bolt-receiving border-hole through the first border structure, such border-hole being isolated from the first border-portion of the chamber. The frame structure also has at least one bolt-receiving frame-hole through the frame structure, the frame-hole being isolated from the frame-portion of the chamber. Each such one or more frame-holes are aligned with a respective border-hole(s). A bolt passes through each aligned pair of bolt-receiving holes such that the border structures and the frame structure are bolted together while maintaining the water/air-tight condition of the chamber.

In some highly preferred embodiments, the housing includes a second border structure forming a second border-portion of the chamber, the LED heat sink being interlocked with the second border structure.

In certain highly preferred embodiments the LED assembly includes a plurality of LED-array modules each separately mounted on its corresponding LED heat sink, the LED heat sinks being interconnected to hold the LED-array modules in fixed relative positions. Each heat sink preferably includes a base with a back base-surface, an opposite base-surface, two base-ends and first and second base-sides, a female side-fin and a male side-fin, one along each of the opposite sides and each protruding from the opposite surface to terminate at a distal fin-edge. The female side-fin includes a flange hook positioned to engage the distal fin-edge of the male side-fin of an adjacent heat sink. At least one inner-fin projects from the opposite surface between the side-fins. One of the LED modules is against the back surface.

In some preferred embodiments, each heat sink includes a plurality of inner-fins protruding from the opposite base-surface. Each heat sink may also include first and second lateral supports protruding from the back base-surface, the lateral supports each having an inner portion and an outer portion, the inner portions of the first and second lateral supports having first and second opposed support-ledges, respectively, forming a heat-sink-passageway slidably supporting one of the LED-array modules against the back base-surface. The first and second supports of each heat sink are preferably in substantially planar alignment with the first and second side-fins, respectively. The flange hook is preferably at the distal fin-edge of the first side-fin.

It is highly preferred that each heat sink be a metal extrusion with the back base-surface of such heat sink being substantially flat to facilitate heat transfer from the LED-array module, which itself has a flat surface against the back-base surface.

Each heat sink also preferably includes a lateral recess at the first base-side and a lateral protrusion at the second base-side, the recesses and protrusions being positioned and configured for mating engagement of the protrusion of one heat sink with the recess of the adjacent heat sink.

In certain of the above preferred embodiments, the female and male side-fins are each a continuous wall extending along the first and second base-sides, respectively. It is further preferred that the inner-fins are also each a continuous wall extending along the base. The inner-fins can be substantially parallel to the side-fins.

In highly preferred embodiments, the LED floodlight fixture further includes an interlock of the housing to the LED assembly. The interlock has a slotted cavity extending along the housing and a cavity-engaging coupler which extends from the heat sink of the LED assembly and is received within the slotted cavity.

In some of such preferred embodiments, in each heat sink, at least one of the inner-fins is a middle-fin including a fin-end forming a mounting hole receiving a coupler. In some versions of such embodiments, the coupler has a coupler-head; and the interlock is a slotted cavity engaging the coupler-head within the slotted cavity. The slotted cavity preferably extends along the border structure and the coupler-head extends from the heat sink of the LED assembly.

DETAILED DESCRIPTION OF PREFERRED EMBODIMENTS

FIGS. 1-11 illustrate preferred fixture support assembly 10 in accordance with this invention. Fixture support assembly 10 includes a mounting bracket 12 that can be mounted to a surface (not shown), preferably a ceiling, a fixture attachment member 14, and an LED flood light 16.

Figure 1:
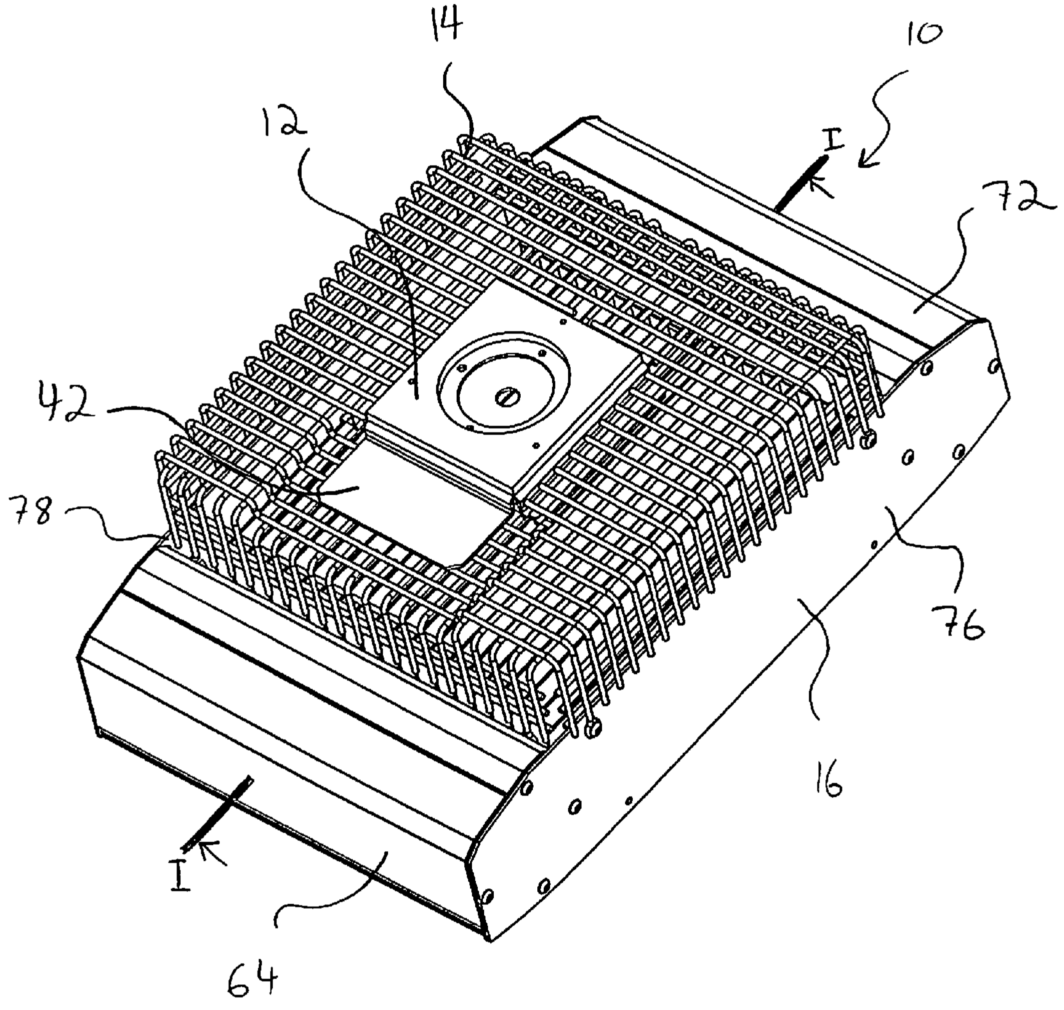
FIG. 1 is a perspective view of a preferred fixture support assembly in accordance with this invention.
Figure 2:
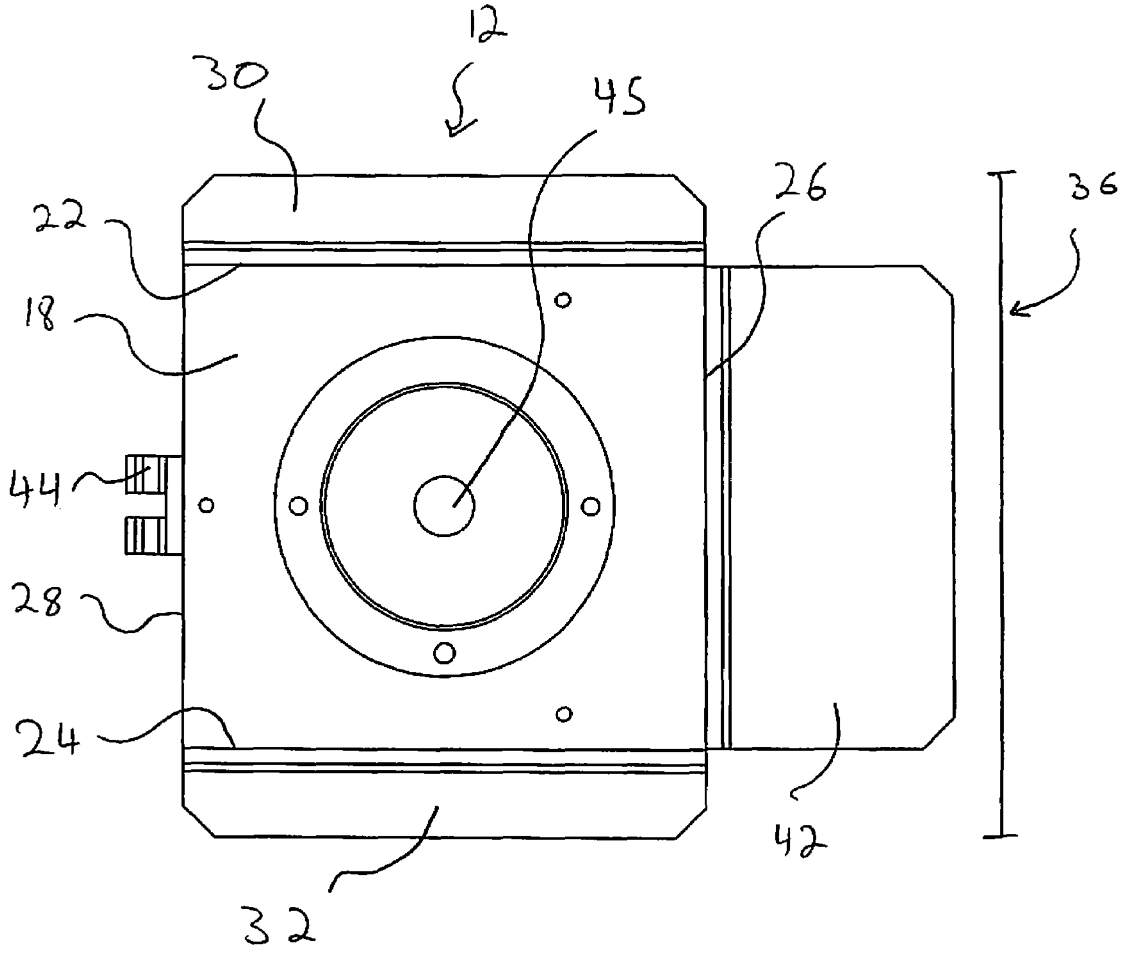
FIG. 2 is top plan of the mounting bracket of the fixture support assembly of FIG. 1.
Figure 3:
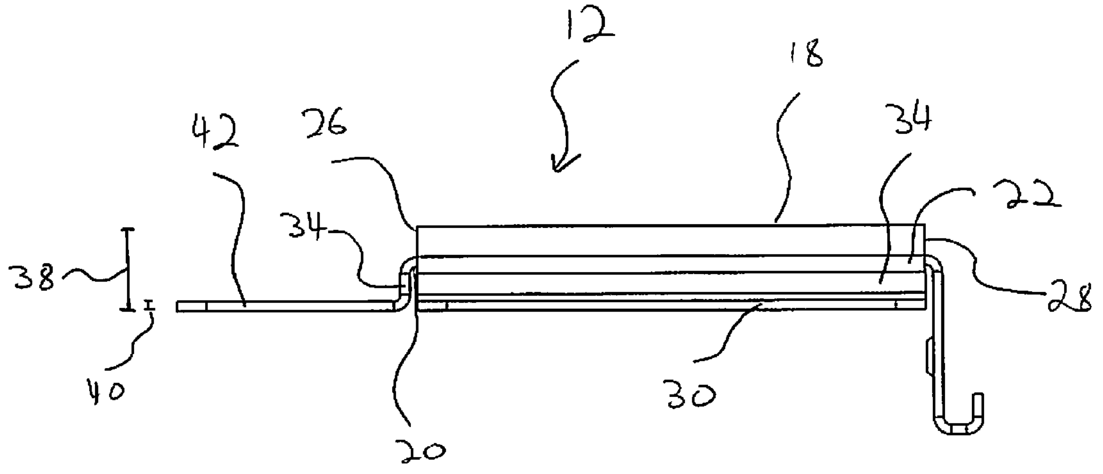
FIG. 3 is side plan view of the mounting bracket of FIG. 2.

As shown best in FIGS. 2 and 3, mounting bracket 12 includes an upper surface 18 and a lower surface 20. The bracket 12 further includes opposite width sides 22, 24 and opposite length sides 26, 28. In this preferred embodiment the bracket 12 also has opposite side flanges 30, 32 extending from the width sides 22, 24. Each side flanges 30, 32 is offset away from the lower surface 20 by a flange support 34. The width dimension 36 of the bracket 12 is defined by the combined width of the bracket 12 and the side flanges 30, 32. The vertical dimension 38 of the bracket 12 includes the height 40 of the width flanges 30, 32 along with the offset of the flange supports 34 and bracket 12 itself. The bracket 12 also includes an end flange 42 extending from one length side 26. The end flange 42 is also offset by a flange support 34. The length dimension 44 of the bracket is defined by the combined length of the bracket 12 and the end flange 42.

In this preferred embodiment the bracket also includes a hook 44. The hook extends away from the lower surface 20 of the bracket 12 at the length side 28 opposite the end flange 42.

Finally, the bracket 12 can include an aperture 45 that will allow passage of wires (not shown) into the LED floodlight 16.

Figure 4:
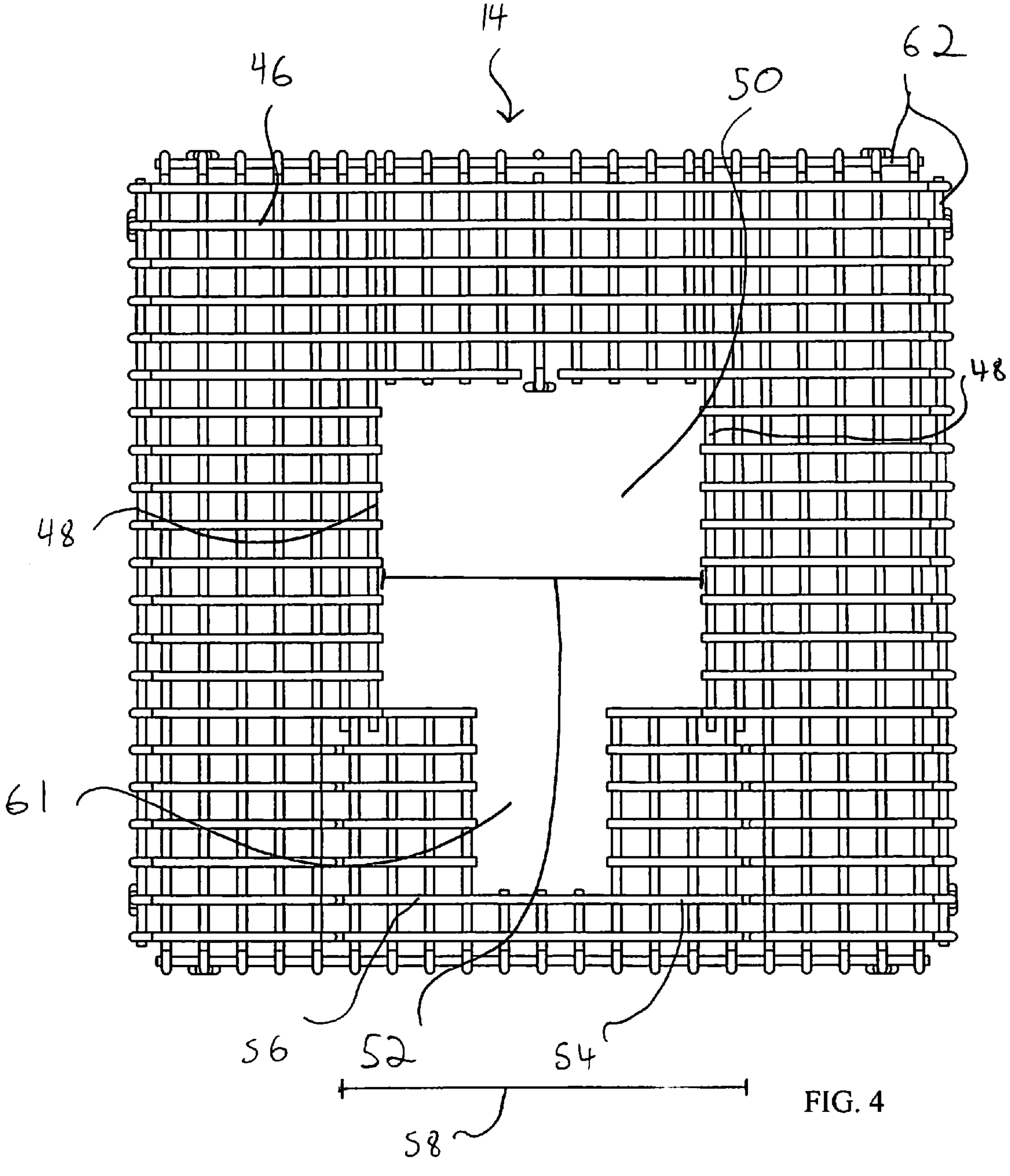
FIG. 4 is top plan view of the fixture attachment member of the fixture support assembly of FIG. 1.
Figure 5:
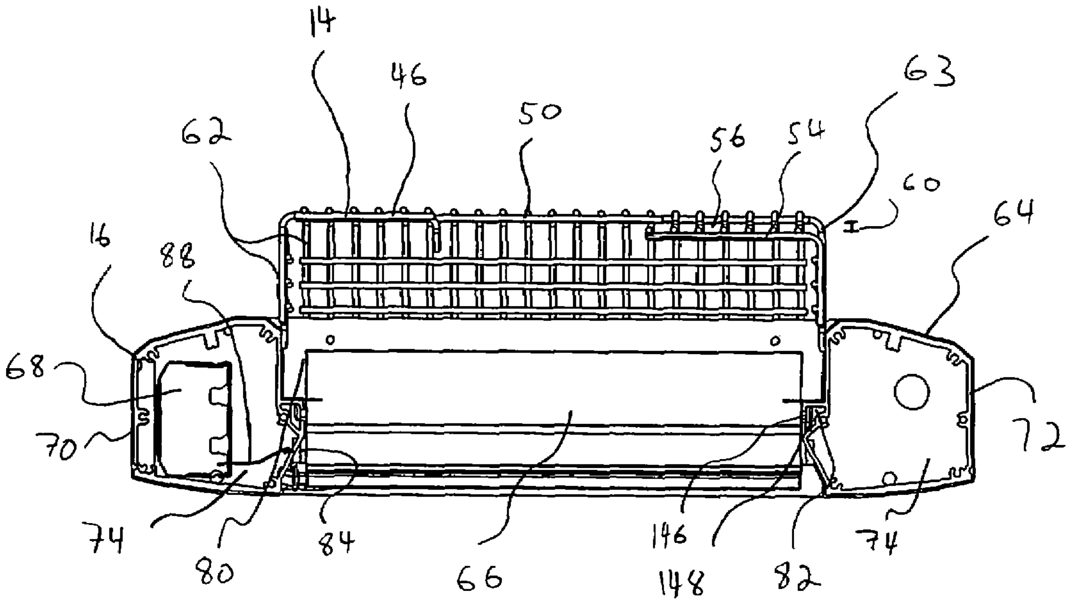
FIG. 5 is a fragmentary view taken along the line I-I of FIG. 1 with the mounting bracket removed.
Figure 6:
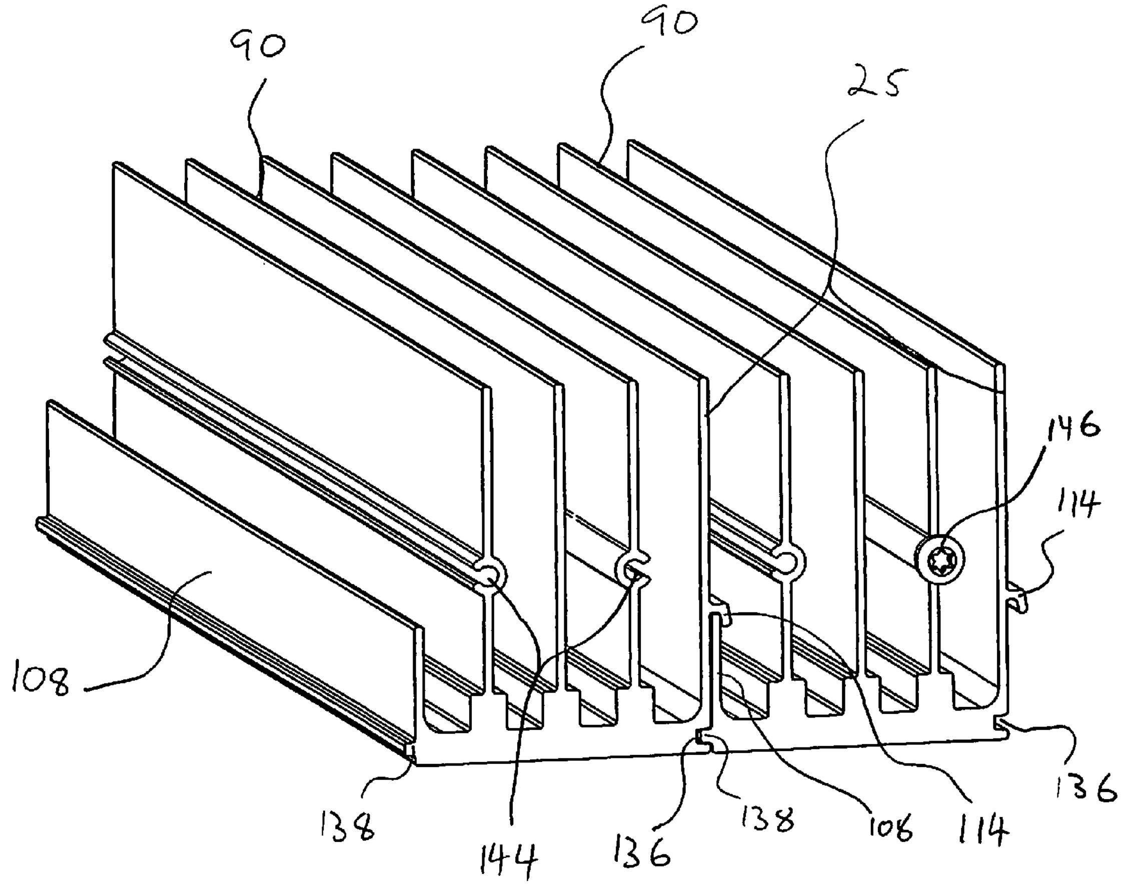
FIG. 6 is an enlarged fragmentary end-wise perspective view of two interconnected LED heat sinks of the LED assembly of the illustrated LED floodlight fixtures.
Figure 7:
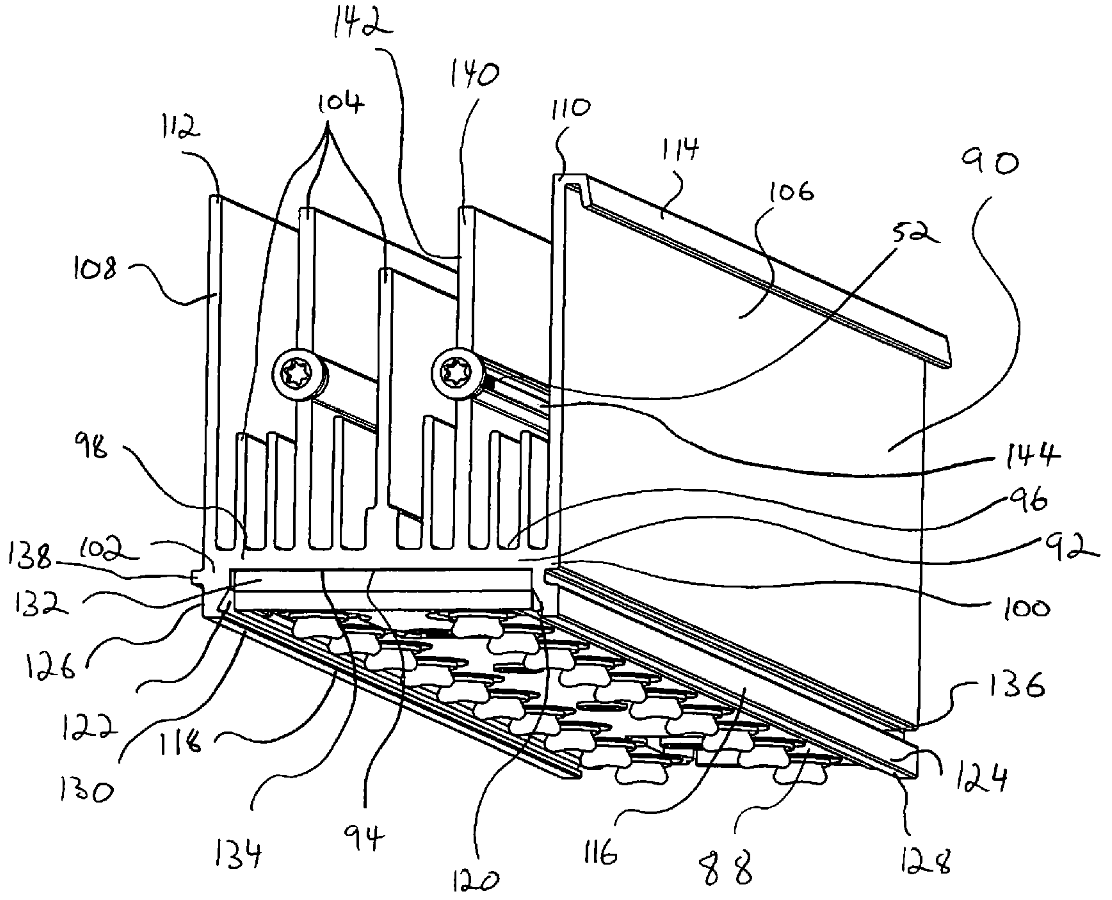
FIG. 7 is an enlarged fragmentary perspective view of one LED-array module LED and its related LED heat sink of the LED assembly of the illustrated fixture support assembly.
Figure 8:
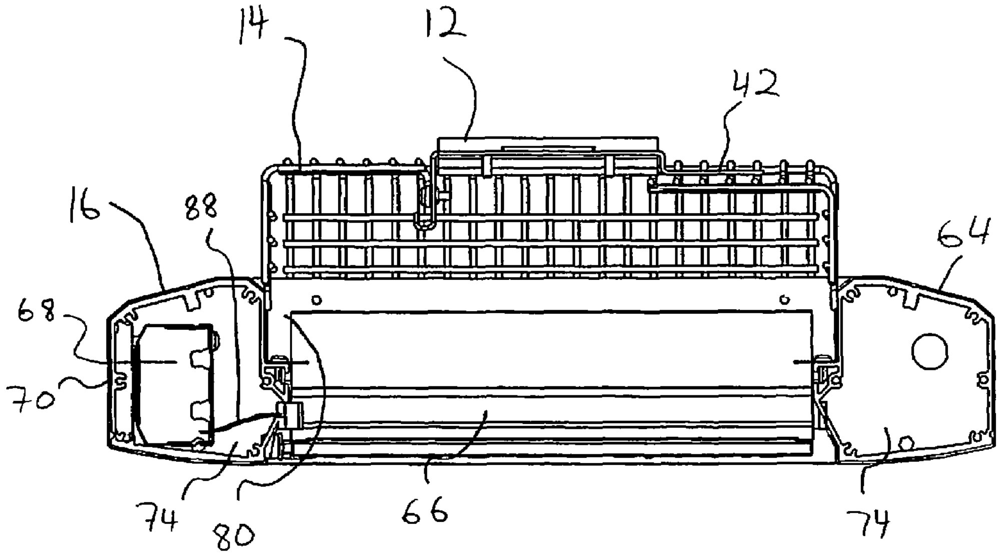
FIG. 8 is a fragmentary view taken along the line I-I of FIG. 1.
Figure 9:
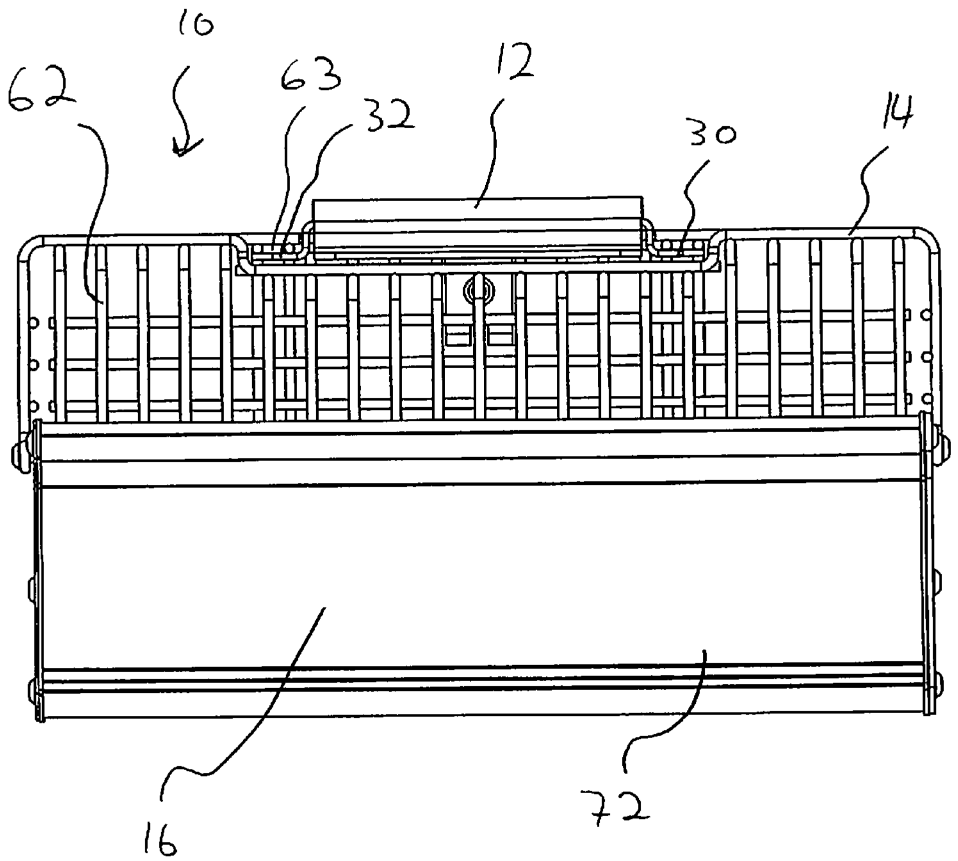
FIG. 9 is an end plan view of the fixture support assembly of FIG. 1.
Figure 10:
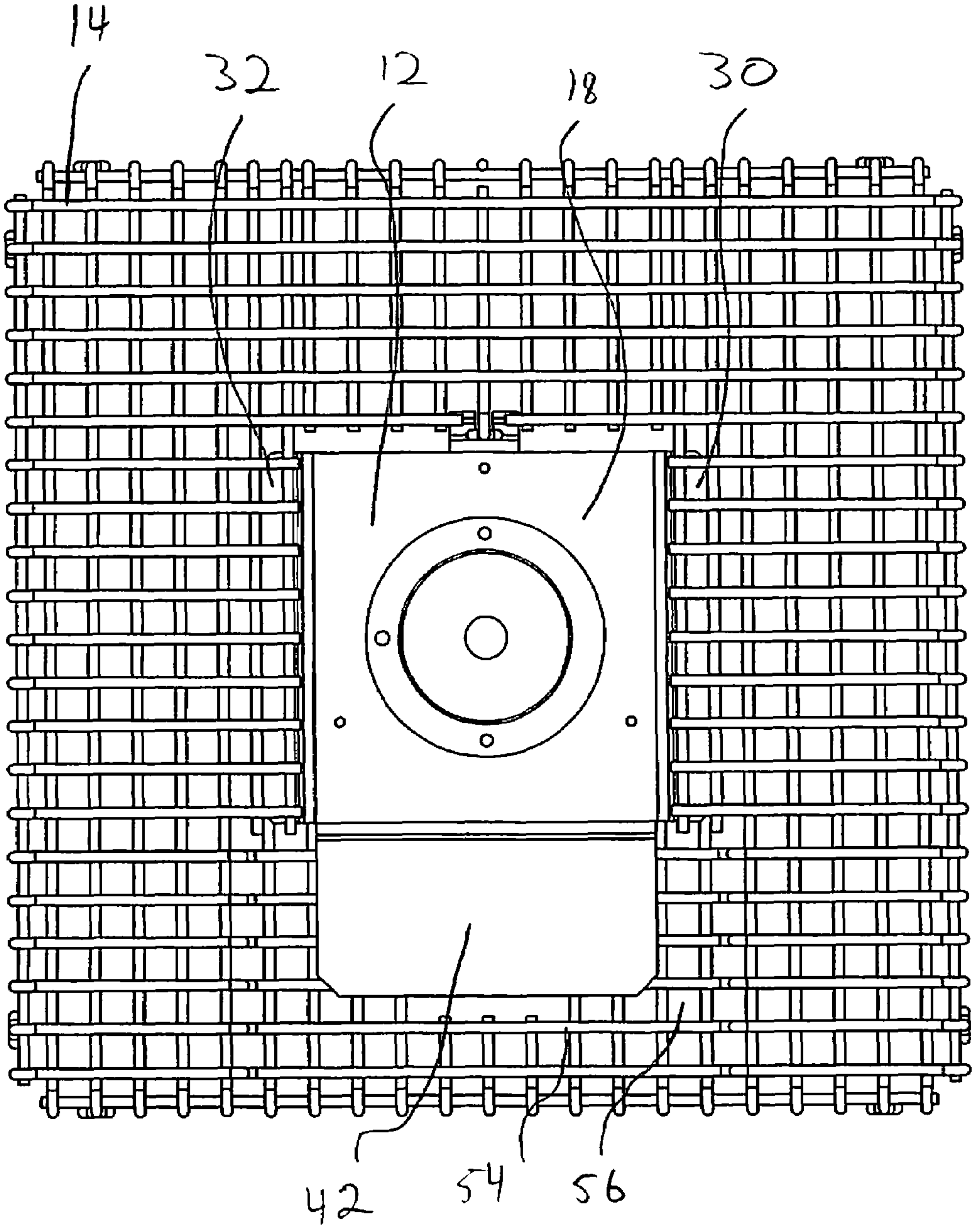
FIG. 10 is a top plan view of the mounting bracket and fixture attachment member of FIG. 1.

The fixture attachment member 14 works in conjunction with the bracket 12 to support the LED floodlight 16. Referring now to FIGS. 4, 5 and 9, the fixture attachment member 14 includes a top 46 having portions 48 that define a top opening 50. The top opening 50 has a width dimension 52 that is less than the width dimension 36 of the bracket 12. The top 46 also includes a recessed portion 54 that defines a slideway 56. The recessed portion 54 is in a overlapping relationship with the portions 48 of the top 46 that define the top opening 50. The slideway 56 is dimensioned and located to meet three criteria: 1) it is in lateral communication with the top opening 50, 2) the width dimension 58 of the slideway 56 is wider than the width dimension 36 of the bracket 12, and 3) that it is spaced sufficiently lower than the opening-defining portions 46 of the top to receive the side flanges 30, 32 of the mounting bracket (i.e., the vertical dimension 60 of the slideway 56 must be greater than the height 40 of the flanges 30, 32). The recessed portion 54 also defines a hook opening 61.

The fixture attachment member 14 further includes a side wall 62 around the perimeter of the fixture attachment member 14. As can be seen in this preferred embodiment, the fixture attachment member 14 can be formed of a metal cage (although it could be of a solid design) that includes gaps at the corners of the shape; however, the concept of around the perimeter as used in this invention includes these gaps. This side wall 62 defines a slideway opening 63 that is dimensioned and disposed to match up with the slideway 56 formed in the recessed portion 54 of the fixture attachment member 14.

The fixture attachment member 14 is attached to the LED floodlight 16 along the side wall 62 opposite the top 46 of the fixture attachment member 14. Referring now to FIGS. 1 and 5-7 the LED floodlight 16 includes a housing 64, an LED assembly 66, and an LED driver 68.

The housing 64 is formed of two border structures 70, 72 which each form a substantially air/water-tight chamber 74. The LED driver 68 is positioned within one of the chambers 74. The border structures 70, 72 are interconnected by housing supports 76, 78 which together form the housing 64 and forms an interior 80 of the housing 64. The interior side of the border structures 70, 72 includes a slotted cavity 82 for attaching the LED assembly 66. The border structure 70 with the LED driver 68 also includes and air/water-tight wire-access 84 for receiving wires 86 from the LED assembly 66.

LED assembly 66 includes a plurality of LED-array modules 88 each separately mounted on its corresponding LED heat sink 90, such LED heat sinks 90 being interconnected to hold LED-array modules 88 in fixed relative positions. Each heat sink 90 includes: a base 92 with a back base-surface 94, an opposite base-surface 96, two base-ends 98 and first and second base-sides 100 and 102; a plurality of inner-fins 104 protruding from opposite base-surface 96; first and second side-fins 106 and 108 protruding from opposite base-surface 96 and terminating at distal fin-edges 110 and 112, first side-fin 106 including a flange hook 114 positioned to engage distal fin-edge 261 of second side-fin 108 of adjacent heat sink 90; and first and second lateral supports 116 and 118 protruding from back base-surface 94, lateral supports 116 and 118 each having inner portions 120 and 122, respectively, and outer portion 124 and 126, respectively. Inner portions 120 and 122 of first and second lateral supports 116 and 118 have first and second opposed support-ledges 128 and 130, respectively, that form a heat-sink-passageway 132 which slidably supports an LED-array module 88 against back base-surface 94. First and second supports 116 and 118 of each heat sink 90 are in substantially planar alignment with first and second side-fins 106 and 108, respectively. The flange hook 114 is at distal fin-edge 251 of first side-fin 106.

Each heat sink 90 is a metal (preferably aluminum) extrusion with back base-surface 94 of heat sink 90 being substantially flat to facilitate heat transfer from LED-array module 88, which itself has a flat surface 134 against back-base surface 94. Each heat sink 90 also includes a lateral recess 136 at first base-side 100 and a lateral protrusion 138 at second base-side 102, recesses 136 and protrusions 138 being positioned and configured for mating engagement of protrusion 138 of one heat sink 90 with recess 136 of adjacent heat sink 90.

Each heat sink 90 inner-fins 104 include two middle-fins 140 each of which includes a fin-end 142 forming a mounting hole 144. A coupler 146 in the form of screw is engaged in mounting hole 144, and extends from heat sink 90 to terminate in a coupler-head 148. Housing 64 has a slotted cavity 82 which extends along, and is integrally formed with, each of border structures 70, 72 and forms the interlock by receiving and engaging coupler-heads 148 therein.

Figure 11:
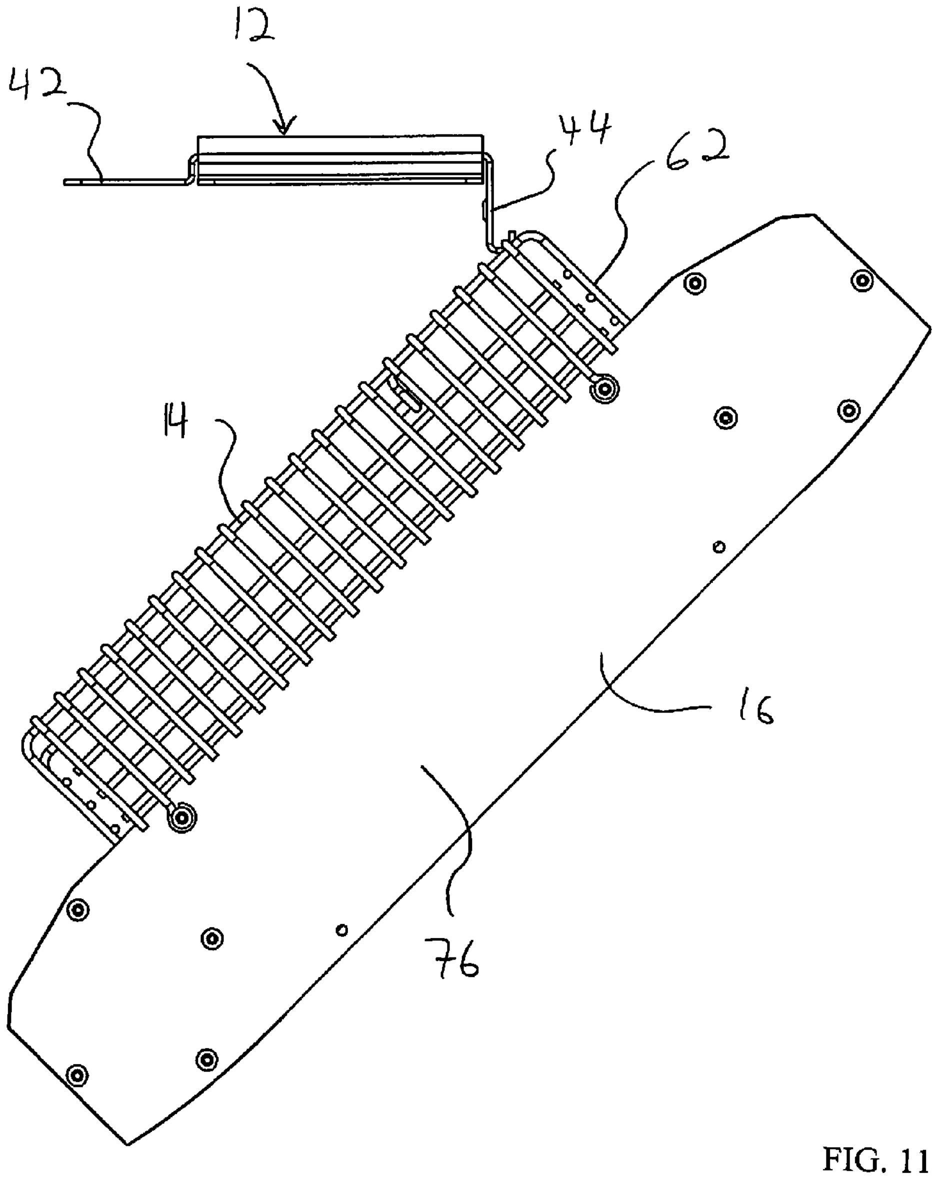
FIG. 11 is a side plan view of the fixture support assembly of FIG. 1 in the installation position.

Referring now to FIGS. 1 and 8-11, the use of the fixture support assembly 10 is shown. The fixture attachment member 14 and LED floodlight 16 are positioned in the slideway 56 so that the side flanges 30, 32 come in contact with the recessed portion 54 of the fixture attachment member 16. The fixture attachment member 14 and floodlight 16 are then repositioned so that the side flanges 30, 32 are positioned under the portions 48 of the top 46 that define the top opening 50 and the mounting bracket 12 is within the top opening 50. When released by the installer the interference between the side flanges 30, 32 and the top 46 hold the fixture attachment member 14 and floodlight 16 in place vertically. Furthermore, the end flange 42 is in contact with the recessed portion 54 which serves to hold the assembly in place. As shown in FIG. 11 during installation the hook 44 can serve to support the fixture attachment member 14 and floodlight 16 during installation by attaching to the cage form of the fixture attachment member 14.

While the principles of the invention have been shown and described in connection with specific embodiments, it is to be understood that such embodiments are by way of example and are not limiting.

The invention claimed is:

1. A ceiling-mounted light-fixture support assembly comprising:

a mounting bracket having upper and lower surfaces, a length, and a width between two width sides; and a fixture attachment member having a top with portions defining a top opening which has a width narrower than the width of the mounting bracket, the fixture attachment member further having a recessed portion defining a slideway which (a) is in lateral communication with the top opening, (b) has a width wider than the width of the mounting bracket, and (c) is spaced sufficiently lower than the opening-defining portions of the top to receive the two width sides of the mounting bracket, whereby the fixture attachment member can be positioned so that the mounting bracket is initially at least partially within the slideway and then subsequently repositioned so that the mounting bracket is mounted within the top opening for light-fixture support.

2. The light fixture support assembly of claim 1 wherein the fixture attachment member includes a side wall around a perimeter of the fixture attachment member extending away from the support assembly opposite the top and wherein a slideway opening in communication with the slideway is defined within the side wall.

3. The light fixture support assembly of claim 2 wherein the slideway opening is the same width as the slideway.

4. The light fixture support assembly of claim 2 wherein at least part of the recessed portion of the fixture attachment member is in a overlapping relationship with the portion of the fixture attachment member defining the top opening.

5. The light fixture support assembly of claim 4 wherein the fixture attachment member is formed as a cage.

6. The light fixture support assembly of claim 5 wherein the mounting bracket includes a hook.

7. The light fixture support assembly of claim 6 wherein the hook extends away from the lower surface of the mounting bracket.

8. The light fixture support assembly of claim 5 wherein the mounting bracket includes a side flange extending from each width side and offset from the lower surface of the mounting bracket wherein the width of the mounting bracket is the width between ends of the side flanges opposite the mounting bracket.

9. The light fixture support assembly of claim 8 wherein the mounting bracket further includes an end flange extending from a length side and offset from the bottom side of the mounting bracket whereby at least a portion of the end flange is in an overlapping relationship with the recessed portion of the fixture attachment member.

10. The light fixture support assembly of claim 5 further including an LED floodlight fixture attached to the fixture attachment member, the floodlight including:

a housing forming a substantially water/air-tight chamber;

at least one electronic LED driver enclosed within the chamber; and an LED assembly secured with respect to the housing adjacent thereto in non-water/air-tight condition, the LED assembly having at least one LED-array module mounted on an LED heat sink;

whereby the fixture attachment member is attached to the floodlight at least partially enclosing the at least one LED assembly.

11. The fixture support assembly of claim 10 wherein the floodlight further includes an interlock of the housing to the LED assembly, the interlock having:

a slotted cavity extending along the housing; and a cavity-engaging coupler which extends from the heat sink of the LED assembly and is received within the slotted cavity.

12. The fixture support assembly of claim 10 wherein the LED assembly includes a plurality of LED modules separately mounted on individual interconnected heat sinks, each heat sink having:

a base with a back surface, an opposite surface, two base-ends and two opposite sides, one of the LED modules being against the back surface;

a female side-fin and a male side-fin, one along each of the opposite sides and each protruding from the opposite surface to terminate at a distal fin-edge, the female side-fin including a flange hook positioned to engage the distal fin-edge of the male side-fin of an adjacent heat sink; and at least one inner-fin protruding from the opposite surface between the side-fins.

13. The fixture support assembly of claim 10 wherein the housing includes substantially water/air-tight wire-access(s) receiving wires from the LED assembly into the chamber.

14. The fixture support assembly of claim 10 wherein the housing includes a first border structure forming a first border-portion of the chamber, the first border structure receiving wires from the at least one LED-array module and the LED heat sink being interlocked with the first border structure.

15. The fixture support assembly of claim 14 wherein the housing includes a second border structure forming a second border-portion of the chamber, the LED heat sink being interlocked with the second border structure.

* * * * *